(12) United States Patent
Chung et al.

(10) Patent No.: US 8,819,687 B2
(45) Date of Patent: Aug. 26, 2014

(54) SCHEDULING FOR MULTIPLE MEMORY CONTROLLERS

(75) Inventors: Jaewoong Chung, Bellevue, WA (US); Debarshi Chatterjee, Mountain View, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 434 days.

(21) Appl. No.: 12/775,647

(22) Filed: May 7, 2010

(65) Prior Publication Data

US 2011/0276974 A1 Nov. 10, 2011

(51) Int. Cl.
*G06F 9/46* (2006.01)

(52) U.S. Cl.
USPC .............. 718/102; 718/1; 718/100; 718/101; 718/103

(58) Field of Classification Search
None
See application file for complete search history.

(56) References Cited

U.S. PATENT DOCUMENTS

| | | | |
|---|---|---|---|
| 6,378,051 B1 | 4/2002 | Henson et al. | |
| 6,909,691 B1* | 6/2005 | Goyal et al. | 370/230 |
| 6,928,646 B1 | 8/2005 | James et al. | |
| 2001/0056456 A1 | 12/2001 | Cota-Robles | |
| 2002/0181440 A1 | 12/2002 | Norman et al. | |
| 2003/0145088 A1 | 7/2003 | Bhogal et al. | |
| 2003/0221071 A1 | 11/2003 | McKenney et al. | |
| 2004/0226015 A1 | 11/2004 | Leonard et al. | |
| 2007/0124793 A1 | 5/2007 | Wang et al. | |
| 2008/0222640 A1 | 9/2008 | Daly et al. | |
| 2008/0320323 A1 | 12/2008 | Brittain et al. | |
| 2009/0043991 A1 | 2/2009 | Guo et al. | |
| 2009/0049545 A1 | 2/2009 | Nagpal et al. | |
| 2009/0055580 A1* | 2/2009 | Moscibroda et al. | 711/104 |
| 2009/0094478 A1 | 4/2009 | Harper et al. | |
| 2009/0216962 A1 | 8/2009 | Mutlu et al. | |
| 2009/0248976 A1 | 10/2009 | Rotithor | |
| 2009/0307691 A1 | 12/2009 | Moscibroda et al. | |
| 2010/0182624 A1 | 7/2010 | Murakami | |
| 2011/0276972 A1 | 11/2011 | Chung et al. | |
| 2011/0276973 A1 | 11/2011 | Chung et al. | |

OTHER PUBLICATIONS

Cloud Computing, Wikipedia, downloaded Oct. 23, 2009, http://en.wikipedia.org/wiki/Cloud_computing, 12 pages.
Intel, "Intel Core i7 Processor," downloaded Oct. 23, 2009, http://www.intel.com/products/processor/corei7/specifications.htm, 2 pages.

(Continued)

*Primary Examiner* — Emerson Puente
*Assistant Examiner* — Dong Kim
(74) *Attorney, Agent, or Firm* — Abel Law Group, LLP (57) ABSTRACT

Some embodiments of a multi processor system implement a virtual-time-based quality-of-service scheduling technique. In at least one embodiment of the invention, a method includes scheduling a memory request to a memory from a memory request queue in response to expiration of a virtual finish time of the memory request. The virtual finish time is based on a share of system memory bandwidth associated with the memory request. The method includes scheduling the memory request to the memory from the memory request queue before the expiration of the virtual finish time of the memory request if a virtual finish time of each other memory request in the memory request queue has not expired and based on at least one other scheduling rule.

23 Claims, 8 Drawing Sheets

(56) References Cited

OTHER PUBLICATIONS

Kim, Yoongu et al., "ATLAS: A Scalable and High-Performance Scheduling Algorithm for Multiple Memory Controllers," HPCA-16 Conference, 16th IEEE International Symposium on High-Performance Computer Architecture, Jan. 11, 2010, 12 pages.

Micron DDR2 SDRAM, 2006, 130 pages.

Mutlu, Onur and Moscibroda, Thomas, "Parallelism-Aware Batch Scheduling: Enhancing both Performance and Fairness of Shared DRAM Systems," Proceedings of the 35th International Symposium on Computer Architecture (ISCA), Jun. 2008, 12 pages.

Mutlu, Onur and Moscibroda, Thomas, "Stall-Time Fair Memory Access Scheduling for Chip Multiprocessors," Proceedings of the 40th International Symposium on Microarchitecture (MICRO), Dec. 2007, 13 pages.

Nesbit, Kyle J. et al., "Fair Queuing Memory Systems," Proceedings of the 39th Annual IEEE/ACM International Symposium on Microarchitecture, 2006, 12 pages.

Righter, Rhonda and Shanthikumar, J. George, "Scheduling Multiclass Single Server Queueing Systems to Stochastically Maximize the Number of Successful Departures," Probability in the Engineering and Information Sciences, 1989, 3:323-333 (11 pages).

Rixner, Scott et al., "Memory Access Scheduling," ISCA-27 (2000), 11 pages.

Chung, Jaewoong et al., "The Common Case Transactional Behavior of Multithreaded Programs," Twelfth International Symposium on High-Performance Computer Architecture, Feb. 11-15, 2006, Austin, TX, pp. 1-12.

Moscibroda, Thomas and Mutlu, Onur, "Memory Performance Attacks: Denial of Memory Service in Multi-Core Systems," Technical Report MSR-TR-2007-15, Proceedings of the 16th USENIX Security Symposium (USENIX Security), pp. 257-274, (21 pages), Boston, MA, Aug. 2007 URL: ftp://ftp.research.microsoft.com/pub/tr/TR-2007-15.pdf.

Rai, Idris A., et al., "Performance Analysis of LAS-based Scheduling Disciplines in a Packet Switched Network," SIGMETRICS/Performance '04, Jun. 12-16, 2004, 12 pages.

* cited by examiner

SCHEDULING FOR MULTIPLE MEMORY CONTROLLERS

BACKGROUND

1. Field of the Invention

The invention is related to computing systems and more particularly to multi-memory request scheduling in computing systems.

2. Description of the Related Art

In a typical computing system, a memory controller is an intermediary between a processor (e.g., central processing unit, digital signal processor, processor core, or core) and main memory (e.g., synchronous dynamic random access memory, i.e., SDRAM) that prioritizes and schedules memory requests (e.g., reads and writes from and to main memory, respectively). The memory controller schedules memory requests by prioritizing memory requests, translating the memory requests into a sequence of memory commands, and issuing to memory the sequence of memory commands associated with a highest priority memory request. A typical processing system (e.g., a chip multiprocessor system) includes multiple memory controllers and multiple memory channels for accessing main memory. Each memory controller controls a different portion of main memory. Each processor can access the portion of main memory controlled by any of the memory controllers in the system, thereby providing a large physical memory space to each processor. Accordingly, multiple processors in the multi-processor system may contend with each other for memory bandwidth. Thus, there is a need to facilitate memory request scheduling in processing systems.

SUMMARY OF EMBODIMENTS OF THE INVENTION

Some embodiments of a processing system implement a virtual-time-based quality-of-service scheduling technique. In at least one embodiment of the invention, a method includes scheduling a memory request to a memory from a memory request queue in response to expiration of a virtual finish time of the memory request. The virtual finish time is based on a share of system memory bandwidth associated with the memory request. The method includes scheduling the memory request to the memory from the memory request queue before the expiration of the virtual finish time of the memory request if a virtual finish time of each other memory request in the memory request queue has not expired and based on at least one other scheduling rule. In at least one embodiment of the invention, the memory request queue resides in a first memory controller of a plurality of memory controllers. In at least one embodiment of the invention, the memory request is requested by a first thread of a plurality of threads executing on a plurality of processors. In at least one embodiment of the invention, the share of system memory bandwidth associated with the memory request is a share of system memory bandwidth allocated to the first thread.

In at least one embodiment of the invention, an apparatus includes a memory controller. The memory controller includes a memory request buffer operative to store a memory request and a corresponding virtual finish time. The memory controller includes a scheduler operative to schedule the memory request to memory in response to expiration of the corresponding virtual finish time. The corresponding virtual finish time is based on a share of system memory bandwidth associated with the memory request. The scheduler is operative to schedule the memory request to memory before the expiration of the corresponding virtual finish time if a virtual finish time of each other memory request in the memory request queue has not expired and based on at least one other scheduling rule. In at least one embodiment of the invention, the memory controller is one of a plurality of memory controllers. In at least one embodiment of the invention, the memory request is requested by a first thread of a plurality of threads executing on a plurality of processors. In at least one embodiment of the invention, the share of system memory bandwidth associated with the memory request is a share of system memory bandwidth allocated to the first thread.

In at least one embodiment of the invention, a method includes scheduling a memory request to a memory according to a virtual finish time of the memory request. The memory request is requested by a first thread executing on a processor. The scheduling is based on a predetermined system memory bandwidth of the first thread. The scheduling is further based on at least one memory latency parameter associated with the memory and selected according to an access type of the memory request and a determination of whether the memory request has a physical address equal to a physical address of a last memory request associated with the first thread scheduled to the memory. In at least one embodiment of the invention, the at least one memory latency parameter includes at least one of precharge period latency, column-address strobe (CAS) latency, write latency, and activate-to-read-or-write latency associated with the memory.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

Figure 1:
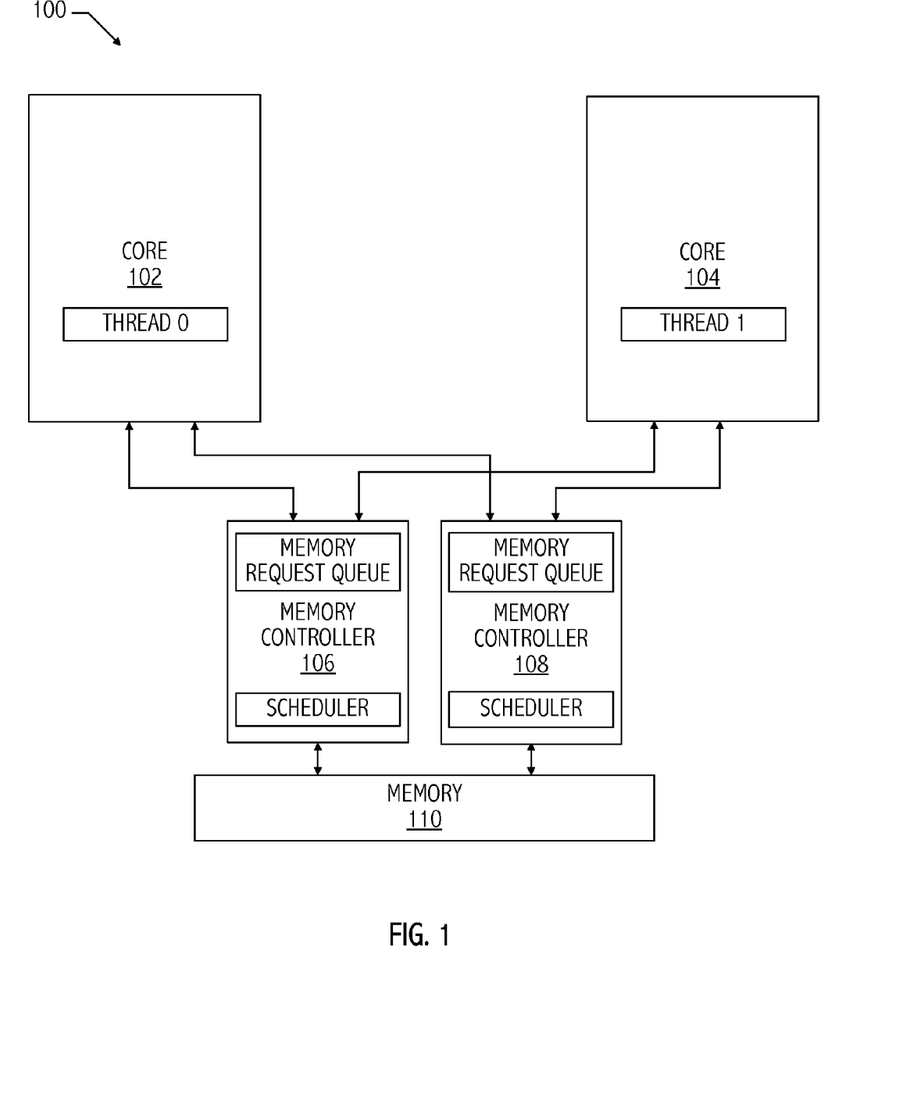
FIG. 1 illustrates a functional block diagram of an exemplary processing system.

Referring to FIG. 1, in an exemplary processing system (e.g., system 100), multiple threads (e.g., thread 0 and thread 1) execute on the system concurrently. A plurality of memory controllers (e.g., memory controller 106 and memory controller 108) provides processor (e.g., core 102 and core 104) access to a memory space (e.g., memory 110). Accordingly, each processor communicates with each memory controller. Each of memory controllers 106 and 108 provides the processors access to a particular portion of memory 110. Memory controllers 106 and 108 store memory requests received from cores 102 and 104 in memory request queues. Schedulers of memory controllers 106 and 108 each schedule memory requests received from thread 0 and thread 1 and stored in the memory request queues to corresponding portions of memory 110.

Figure 2:
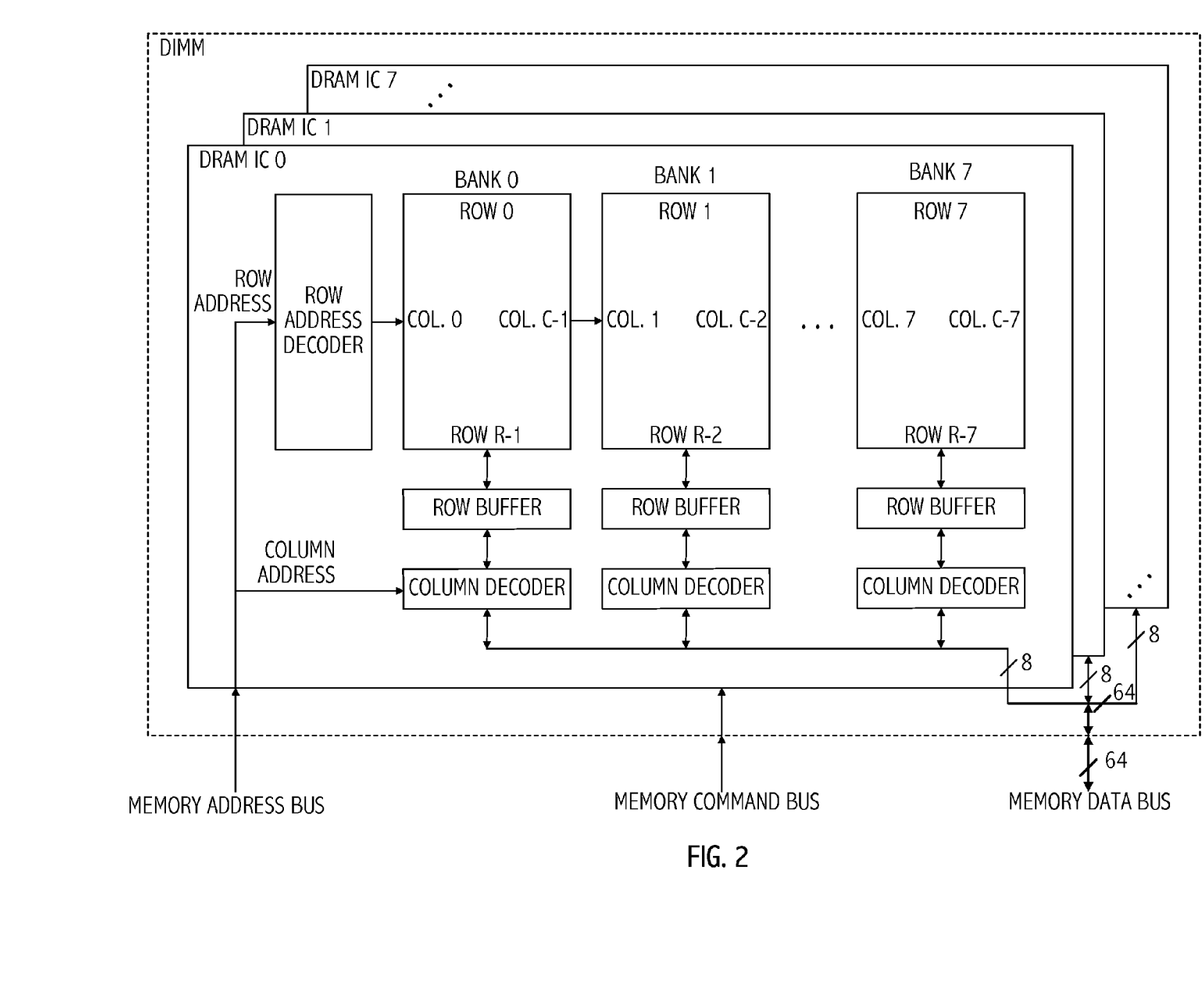
FIG. 2 illustrates a functional block diagram of an exemplary memory system consistent with at least one embodiment of the invention.

Referring to FIG. 2, an exemplary memory system includes one or more memory integrated circuits (e.g., one or more DRAM integrated circuits). In at least one embodiment, the memory system includes multiple memory integrated circuits, which are accessed in parallel (e.g., configured as a dual in-line memory module, i.e., DIMM). In at least one embodiment of the memory system, each memory integrated circuit includes a data interface (e.g., 8-bit data interface) that is combined with data interfaces of other memory integrated circuits to form a wider data interface (e.g., 64-bit data interface). In at least one embodiment of the memory system, each memory integrated circuit includes multiple independent memory banks, which can be accessed in parallel. In at least one embodiment of the memory system, each memory bank includes a two-dimensional array of DRAM (i.e., dynamic random access memory) cells, including multiple rows and columns. A location of the memory is accessed using a memory address including bank, row, and column fields. In at least one embodiment of the memory system, only one row in a bank can be accessed at a time and the row data is stored in a row buffer dedicated to that bank. An activate command moves a row of data from the memory array into the row buffer. Once a row is in the row buffer, a read or write command can read/write data from/to the associated memory address. Thus, the latency of a memory command depends on whether or not a corresponding row is in a row buffer of an associated memory bank.

If the contents of a memory address are in the row buffer (i.e., the memory address hits the row buffer), then a memory controller only needs to issue a read or write command to the memory bank, which has a memory access latency of $t_{CL}$ or $t_{WL}$, respectively If the contents of the memory address are not present in the row buffer (i.e., the memory address misses the row buffer), then the memory controller needs to precharge the row buffer, issue an activate command to move a row of data into the row buffer, and then issue a read or write command to the memory bank, which has an associated memory access latency of $t_{RCD}+t_{CL}+t_{RP}$ or $t_{RCD}+t_{WL}+t_{RP}$, respectively. Note that the memory architecture of FIG. 2 is exemplary only and the teachings described herein apply to systems including other memory architectures.

Figure 3A:
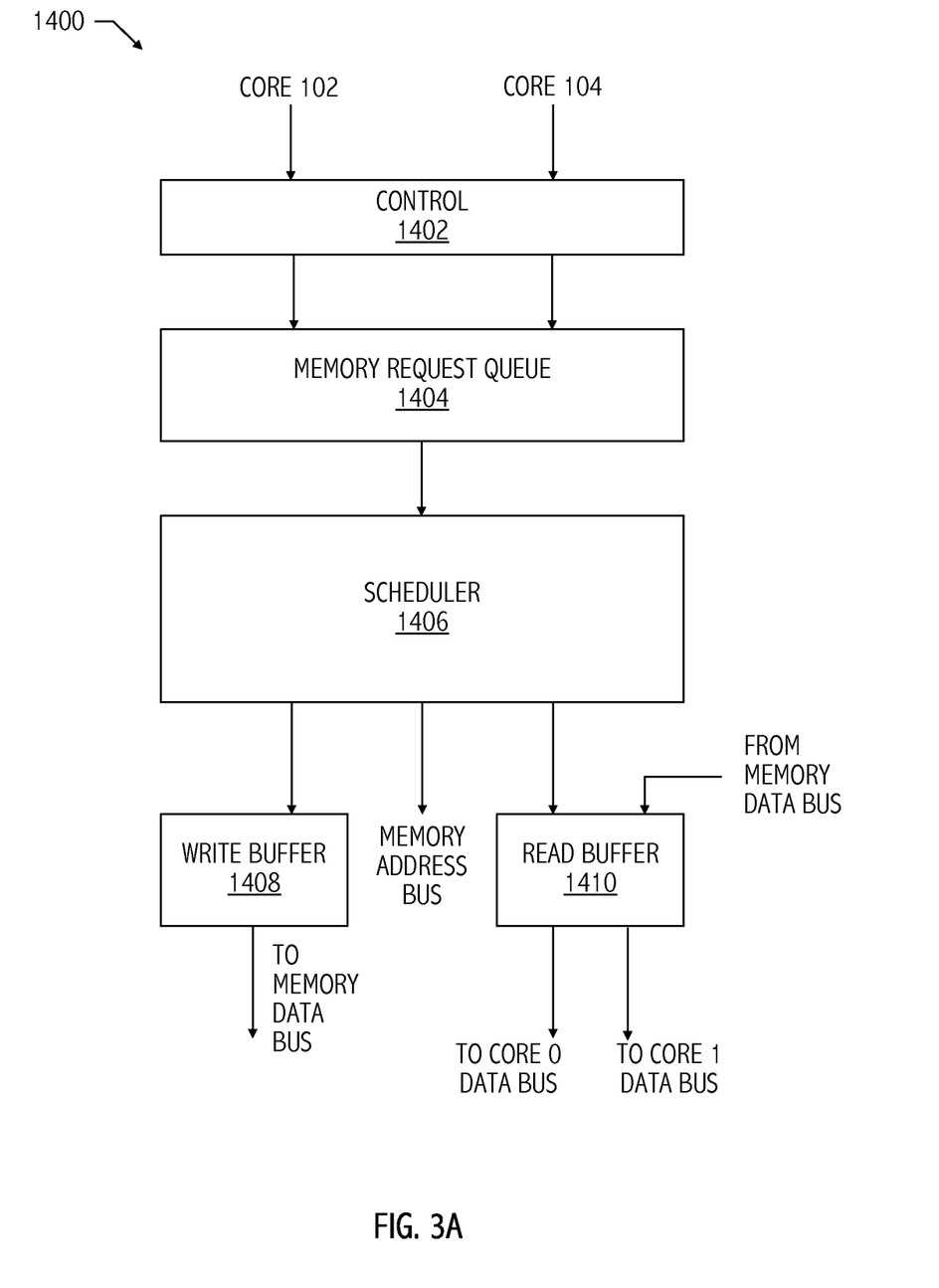
FIGS. 3A and 3B illustrate functional block diagrams of exemplary memory controllers consistent with various embodiments of the invention.
Figure 3B:
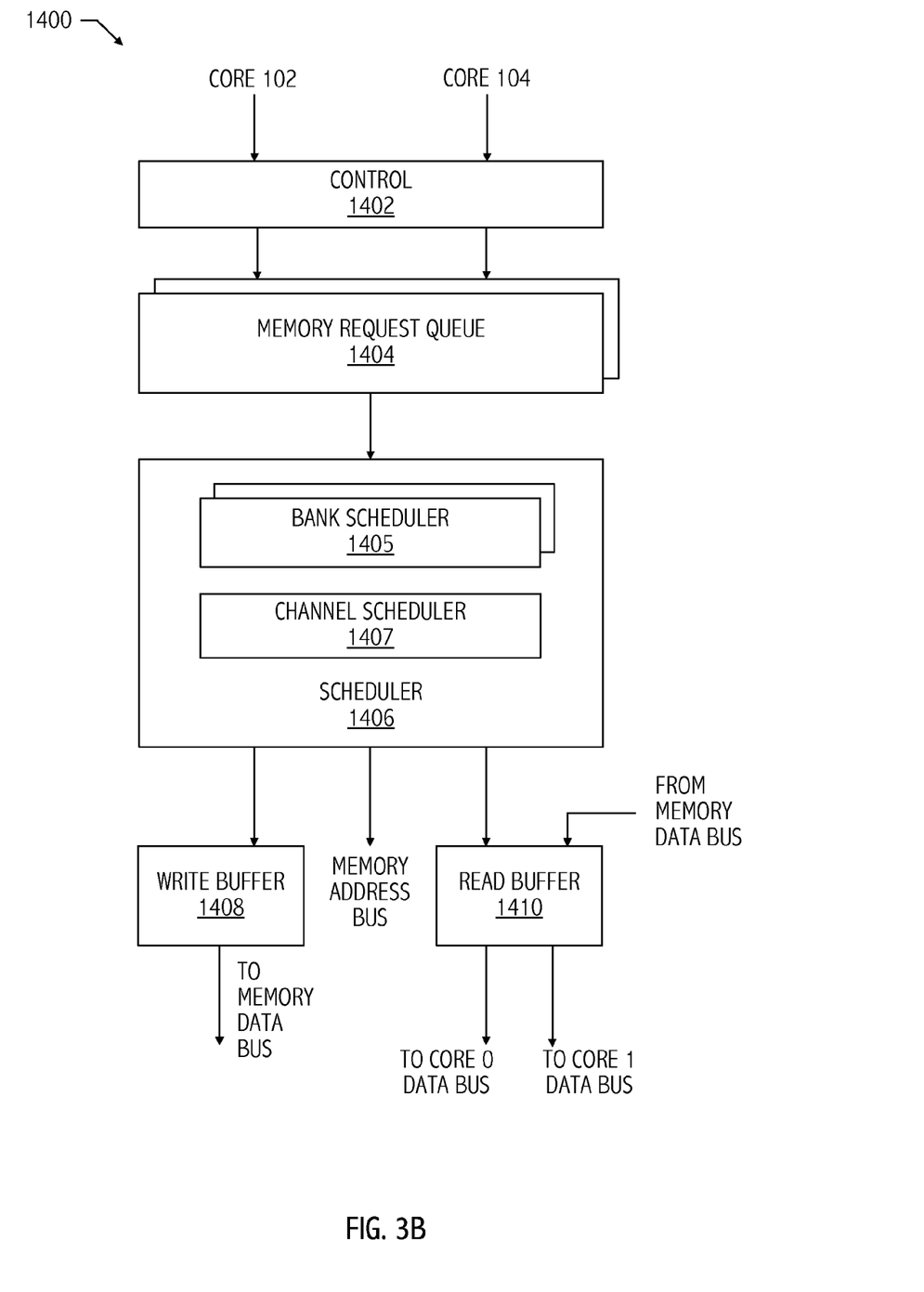

Referring to FIGS. 3A and 3B, an exemplary memory controller (e.g., memory controller 1400) receives memory requests from core 102 and core 104. Control circuit 1402 assigns an arrival time to each memory request and stores the arrival time with the memory request (e.g., request type and request identifier) in memory request queue 1404. Scheduler 1406 prioritizes the memory requests and schedules the memory requests by reordering the memory requests into one or more sequences of memory commands based on the priorities. Scheduler 1406 sequentially executes the memory commands via a memory address bus and a memory data bus. Referring to FIG. 3B, in at least one embodiment, the portion of memory serviced by memory controller 1400 includes multiple memory banks, memory request buffer 1404 includes a request buffer for memory requests corresponding to each memory bank, and scheduler 1406 includes a bank scheduler for each memory bank (e.g., bank schedulers 1405) and a channel scheduler (e.g., channel scheduler 1407).

Still referring to FIG. 3B, in at least one embodiment of memory controller 1400, a bank scheduler 1405 selects pending memory requests with the highest priority from a corresponding memory request queue and generates a sequence of memory commands to read or write the request data to or from the memory, respectively. In at least one embodiment, bank scheduler 1405 monitors timing constraints for a corresponding memory bank to ensure that a sequence of memory commands complies with memory specifications. If a memory command is ready with respect to the memory specifications, then bank scheduler 1405 sends the command to channel scheduler 1407. In at least one embodiment, channel scheduler 1407 reorders and/or interleaves memory requests in priority order (e.g., highest priority commands first) from each of the bank schedulers 1405 into memory commands, which are issued on the memory address bus and signal write buffer 1408 and read buffer 1410. Channel scheduler 1407 sends an acknowledgement to a corresponding bank scheduler 1405 when channel scheduler 1407 issues a memory command and bank scheduler 1405 updates a state accordingly. Channel scheduler 1407 also monitors the state of the memory address and data buses and bank timing constraints to reduce or eliminate channel scheduling conflicts and timing constraint violations.

In at least one embodiment of memory controller 1400, bank schedulers 1405 and channel scheduler 1407 use the same priority policies. Referring to FIG. 3A, in at least one embodiment, memory controller 1400 services only one memory bank and scheduler 1406 does not include bank schedulers 1405 and channel scheduler 1407. Accordingly, as referred to herein, a "scheduler" is any one of a bank scheduler, a channel scheduler, a scheduler of a memory controller servicing only one memory bank, or other suitable memory request scheduler unless otherwise specified. In addition, note that memory controller 1400 of FIG. 3A and memory controller 1400 of FIG. 3B are exemplary only and techniques described herein are applicable to other memory controller architectures.

Referring back to FIG. 1, system 100 includes multiple memory controllers with multiple memory channels, which increases the available memory bandwidth, but also increases the complexity of supporting a target system quality-of-service (i.e., QoS). As referred to herein, quality-of-service is the ability to guarantee a particular level of memory bandwidth to a thread executing on one of the plurality of processors of a multi-processor system. In an exemplary multi-tenant environment of cloud computing, multiple applications from multiple tenants share a multi-processor system. The tenants lease an amount of computing resources required by their applications and a cloud computing service provider allocates to the applications resources from the shared multi-processor system according to amounts that the tenants pay. Multi-processor systems that use typical quality-of-service scheduling to schedule memory requests according to a target quality-of-service and local memory bandwidth usage information will not realize the full available memory bandwidth for a target quality-of-service.

For example, still referring to FIG. 1, in an exemplary application, two threads (e.g., thread 0 and thread 1) execute on cores 102 and 104, respectively, and each of memory controllers 106 and 108 supports 50% of the overall system memory bandwidth. Thread 0 and thread 1 do not use memory controllers 106 and 108 evenly (i.e., thread 0 and thread 1 do not each use 50% of each of the memory controllers bandwidth). Instead, thread 0 demands 40% of system memory bandwidth from memory controller 106 and 10% of system memory bandwidth from memory controller 108. Meanwhile, thread 1 demands 10% of system memory bandwidth from memory controller 106 and 40% of system memory bandwidth from memory controller 108. If the target quality-of-service for each application is 50% of system memory bandwidth, then, using local quality-of-service scheduling based on local memory bandwidth usage information, memory controller 106 will assign a priority to thread 0 that indicates thread 0 is overutilizing memory bandwidth of memory controller 106, and memory controller 108 will assign a priority to thread 1 that indicates thread 1 is overutilizing memory bandwidth of memory controller 108, even though threads 0 and 1 evenly use the system memory bandwidth (e.g., 40% of bandwidth of memory controller 106+ 10% of bandwidth of memory controller 108=50% of system memory bandwidth used by thread 0 and 10% of bandwidth of memory controller 106+40% of bandwidth of memory controller 108=50% of system memory bandwidth used by thread 1). If memory controllers 106 and 108 locally schedule memory requests based on this local memory bandwidth information, the memory controllers enforce quality-of-service individually by penalizing an apparently overutilizing thread from the perspective of the memory controller (e.g., by lowering scheduling priorities of memory requests associated with overutilizing threads). As a result, memory controller 106 slows down the execution of thread 0 and memory controller 108 slows down the execution of thread 1, which are unnecessary to achieve the target quality-of-service.

Other scheduling techniques (e.g., first-ready, first-come, first-served scheduling (FRFCFS), stall-time fair memory access scheduling, and parallelism-aware batch scheduling) improve scheduling locally, i.e., scheduling on a single memory controller basis. For example, a FRFCFS rule locally prioritizes ready memory commands over memory commands that are not ready, locally prioritizes SDRAM column address strobe (CAS) commands over SDRAM row address strobe (RAS) commands, and locally prioritizes commands with earliest arrival times. Parallelism-aware batch scheduling groups memory requests in batches locally and executes the memory requests batch-by-batch. The scheduling technique locally schedules memory requests according to a shortest-job-first rule applied to the batches. Stall-time fair memory access scheduling distributes memory bandwidth of a memory controller in a way to equally slow down threads executing concurrently.

A fair queuing memory scheduling technique assigns memory bandwidth based on a predetermined share of memory bandwidth. The technique determines a virtual finish time of a memory request based on a per-thread virtual clock that progresses slower than a real memory clock according to the thread share of memory bandwidth. The scheduler in the memory controller prioritizes a memory request with an earlier virtual finish time over a memory request with a later virtual finish time. Accordingly, the memory controller provides the illusion that the thread runs with a slower, but dedicated memory controller. For example, the scheduler handles memory requests for a thread with a predetermined share of memory bandwidth of 50% as if it is running with a dedicated memory controller with a clock half as fast as the actual memory clock. However, this technique will not provide the predetermined thread allocation share of memory bandwidth if other scheduling criterion (e.g., row-buffer-hit scheduling) are used to prioritize memory requests before applying fair-queuing memory scheduling or if error is introduced into the priority determination by inaccurate virtual time calculations.

Figure 4:
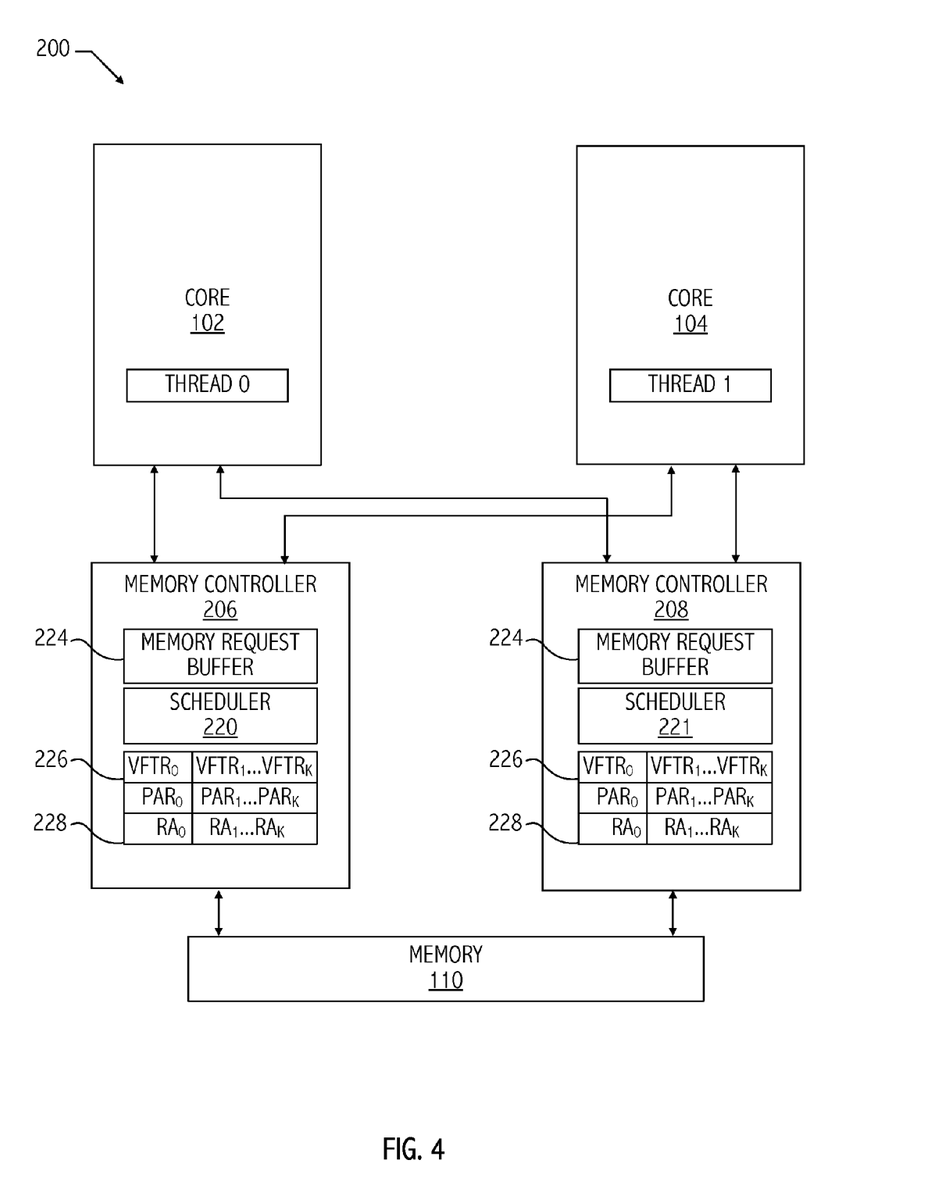
FIG. 4 illustrates a functional block diagram of a processing system implementing a virtual-time-based quality-of-service scheduling technique consistent with at least one embodiment of the invention.
Figure 5:
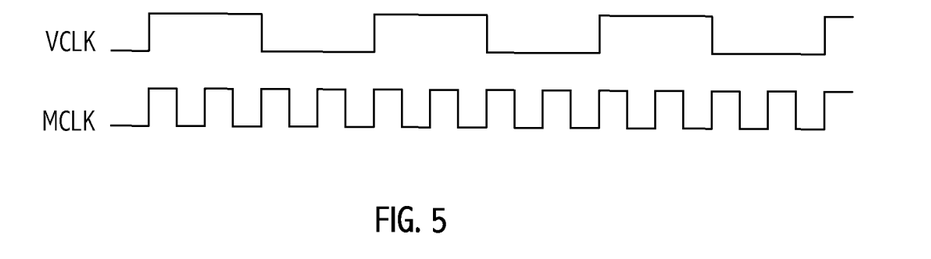
FIG. 5 illustrates timing diagrams consistent with the virtual-time-based quality-of-service scheduling technique, consistent with at least one embodiment of the invention.

Referring to FIG. 4, in at least one embodiment, a processing system (e.g., system 200) implements a virtual-time-based quality-of-service scheduling technique for multiple memory controllers. System 200 allocates predetermined shares of system memory bandwidth to threads executing on cores 102 and 104 (e.g., thread 0 and thread 1). The predetermined system memory bandwidth allocated to a thread may be dynamically determined by an operating system or virtual machine monitor. Allocating a thread a fraction of system memory bandwidth is analogous to allocating a thread a private memory system running at a fraction of the frequency of actual physical memory, e.g., when the memory system is an SDRAM system, all of the SDRAM timing characteristics are time-scaled by the reciprocal of the fraction. The quality-of-service (QoS) objective is to allocate thread k a fraction of the system memory bandwidth that runs no slower than the same thread on a private memory system running at a fraction of the frequency of the shared physical memory. Each thread executes memory requests under the illusion that the thread is executing with a private memory controller that is slowed down in proportion to the predetermined share of system memory bandwidth allocated to the thread. Referring to FIG. 5, a virtual clock (e.g., VCLK) for a thread that has 50% predetermined share of system memory bandwidth runs 50% slower than a system memory clock (e.g., MCLK). Referring back to FIG. 4, cores 102 and 104 communicate the predetermined system memory bandwidth information to memory controllers 206 and 208.

Still referring to FIG. 4, a memory controller (e.g., memory controller 206 or memory controller 208) determines a virtual finish time of a memory request from a thread according to the virtual clock for that thread, which progresses in proportion to the predetermined share of system memory bandwidth for the thread. For each cycle of the memory clock, a scheduler in the memory controller (e.g., scheduler 220 of memory controller 206 or scheduler 221 of memory controller 208) ensures that each memory request in the memory request queue is scheduled no later than its virtual finish time or shortly thereafter. Since the determination of the virtual finish time and its enforcement based on a thread-specific predetermined share of system memory bandwidth are performed on a per-request basis locally by each memory controller, the virtual-time-based quality-of-service scheduling technique enforces quality-of-service system-wide over multiple memory controllers.

Still referring to FIG. 4, in at least one embodiment of the virtual-time-based quality-of-service scheduling technique, system 200 includes a set of storage elements (e.g., registers) per thread. The number of threads executing concurrently in a system (i.e., K) equals the number of processors times the number of hardware thread contexts supported per processor. In at least one embodiment of a processing system, at least one processor supports simultaneous multithreading and the number of hardware contexts is greater than one. In at least one embodiment of the virtual-time-based quality-of-service scheduling technique, the set of storage elements includes a virtual finish time register per memory bank serviced by the memory controller (e.g., $VFTR_{k,i}$) that records the virtual finish time of the last memory request from thread k processed at memory bank i. In at least one embodiment of the virtual-time-based quality-of-service scheduling technique, the set of storage elements includes a physical address register per bank (e.g., $PAR_{k,i}$) that records the physical address of the last memory request from the thread k processed at memory bank i. In at least one embodiment of the virtual-time-based quality-of-service scheduling technique, the set of storage elements includes a resource share register (e.g., $RA_k$) that records a predetermined share of system memory bandwidth for thread k.

Figure 6:
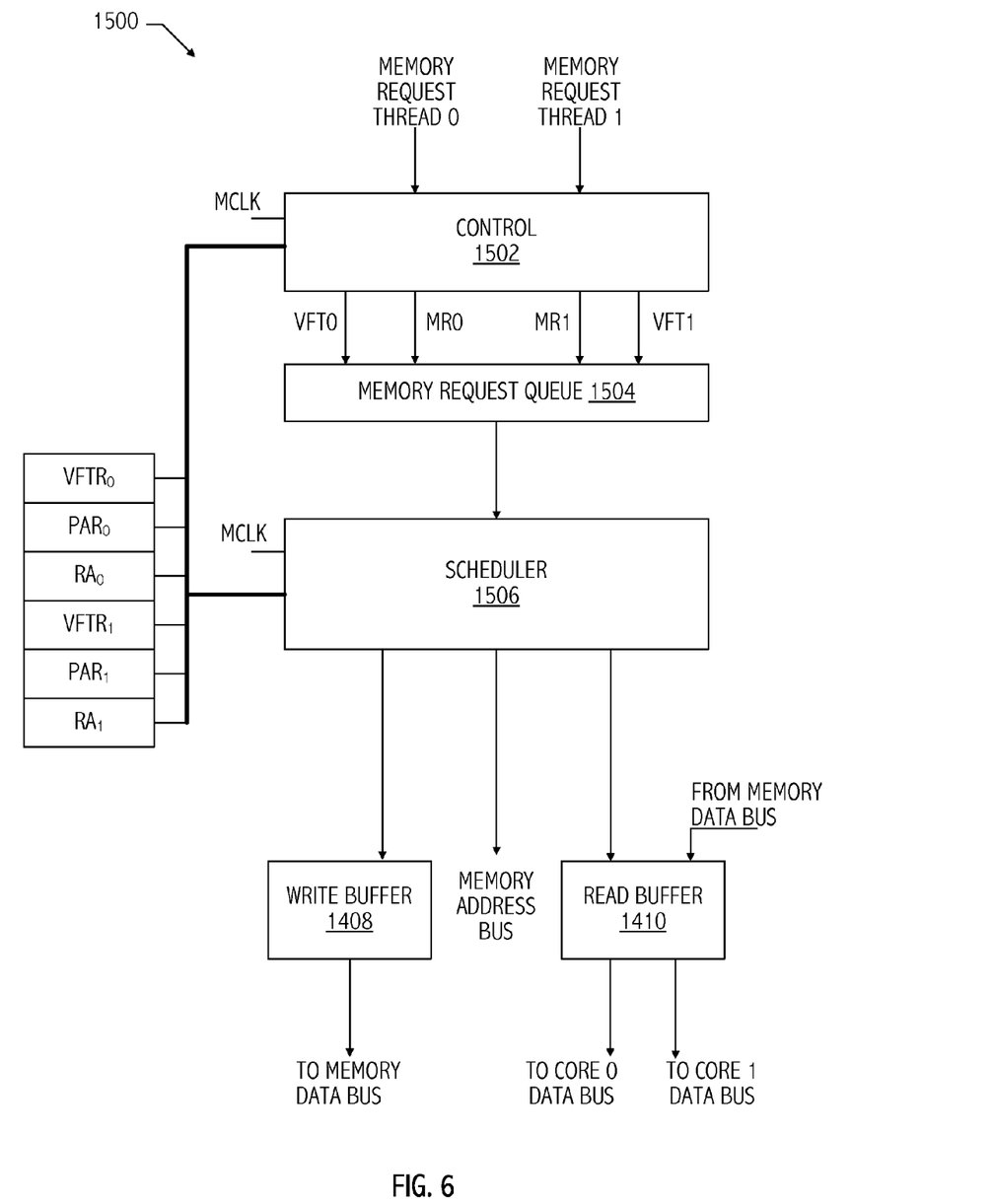
FIG. 6 is a functional block diagram of a memory controller in a processing system implementing the virtual-time-based quality-of-service scheduling technique, consistent with at least one embodiment of the invention.

Referring to FIG. 6, In at least one embodiment of the virtual-time-based quality-of-service scheduling technique, memory controller 1500 (e.g., memory controller 206 or memory controller 208) includes control logic (e.g., control 1502, which may be included in scheduler 1506 or included as a separate control circuit in memory controller 400) that clears the $VFTR_{k,i}$ and $PAR_{k,i}$ registers (i.e., set to '0') initially. In least one embodiment of the virtual-time-based quality-of-service scheduling technique, a predetermined share of system memory bandwidth has a granularity of 1% and the resource share registers, $RA_k$, (e.g., $RA_0$ and $RA_1$ for thread 0 and thread 1, respectively) are set to a particular number between 0 and 100. The service realized by a thread is the sum of the portions of system memory bandwidth received from each memory controller. Note that in other embodiments of the virtual-time-based quality-of-service scheduling technique, different granularities and resource shares are used and the resource share registers are set accordingly. In response to a memory request arriving from thread k to memory controller 1500, control 1502 determines a virtual finish time of the memory request. Control 1502 determines a memory bank identifier from a physical address of the memory request and compares the physical address of the request with the contents of a physical address register for the associated thread and memory bank (e.g., contents of $PAR_{0,i}$ or $PAR_{1,i}$ for memory bank i for thread 0 or thread 1, respectively) to determine if the memory request would hit the row buffer of the identified memory bank. In at least one embodiment of the virtual-time-based quality-of-service scheduling technique, the memory controller assumes an open row policy where data in a row buffer are stored until a new memory request misses the row buffer. Control 1502 determines the job length of the memory request as summarized in Table 1, based on column-address-strobe (CAS) latency (read latency) ($t_{CL}$), write latency ($t_{WL}$), activate-to-read or write delay ($t_{RCD}$), and precharge period ($t_{RP}$) for an exemplary memory 110 (e.g., SDRAM memory). Note that for a particular embodiment, these times are constants and need not be recomputed after initialization, but will vary with different memory implementations.

TABLE 1

Memory Request Job Length

| Access Type | Row Buffer | Memory Request Job Length |
| --- | --- | --- |
| Read | Hit | $t_{CL}$ |
| Read | Miss | $t_{RCD} + t_{CL} + t_{RP}$ |
| Write | Hit | $t_{WL}$ |
| Write | Miss | $t_{RCD} + t_{WL} + t_{RP}$ |

In at least one embodiment of the virtual-time-based quality-of-service scheduling technique, control 1502 determines a virtual job length based on the job length and the contents of the thread resource share register, $RA_k$: virtual job length=job length×(100/$RA_k$). The virtual job length effectively accounts for the memory request of a thread running according to a virtual clock slower than the actual memory clock. Accordingly, the virtual job length is longer than when calculated using the actual memory clock. In at least one embodiment of the virtual-time-based quality-of-service scheduling technique, control 1502 determines a virtual start time based on the virtual finish time of the last memory request from the thread processed at all memory banks serviced by the memory controller: virtual start time=MAX{$VFTR_{k,i}$, at the arrival time of the memory request}. The virtual start time accounts for an outstanding memory request from thread k still being processed at bank i from the perspective of a virtual clock for the thread. In at least one embodiment of virtual-time-based quality-of-service scheduling technique, control 1502 determines a virtual finish time based on the virtual start time and the virtual job length: virtual finish time=virtual start time+virtual job length. In at least one embodiment of the virtual-time-based quality-of-service scheduling technique, a memory request queue (e.g., memory request queue 1504) includes facilities to store a calculated virtual finish time of a corresponding memory request. In at least one embodiment of the virtual-time-based quality-of-service scheduling technique, control 1502 stores the virtual finish time in memory request queue 1504 with the memory request. A memory scheduler (e.g, scheduler 1506) uses the recorded virtual finish time for quality-of-service, as described below. After scheduler 1506 schedules a memory request, scheduler 1506 (or control 1502) updates the $VFTR_{k,i}$ to a new virtual finish time and the $PAR_{k,i}$ to a new physical address.

Figure 7:
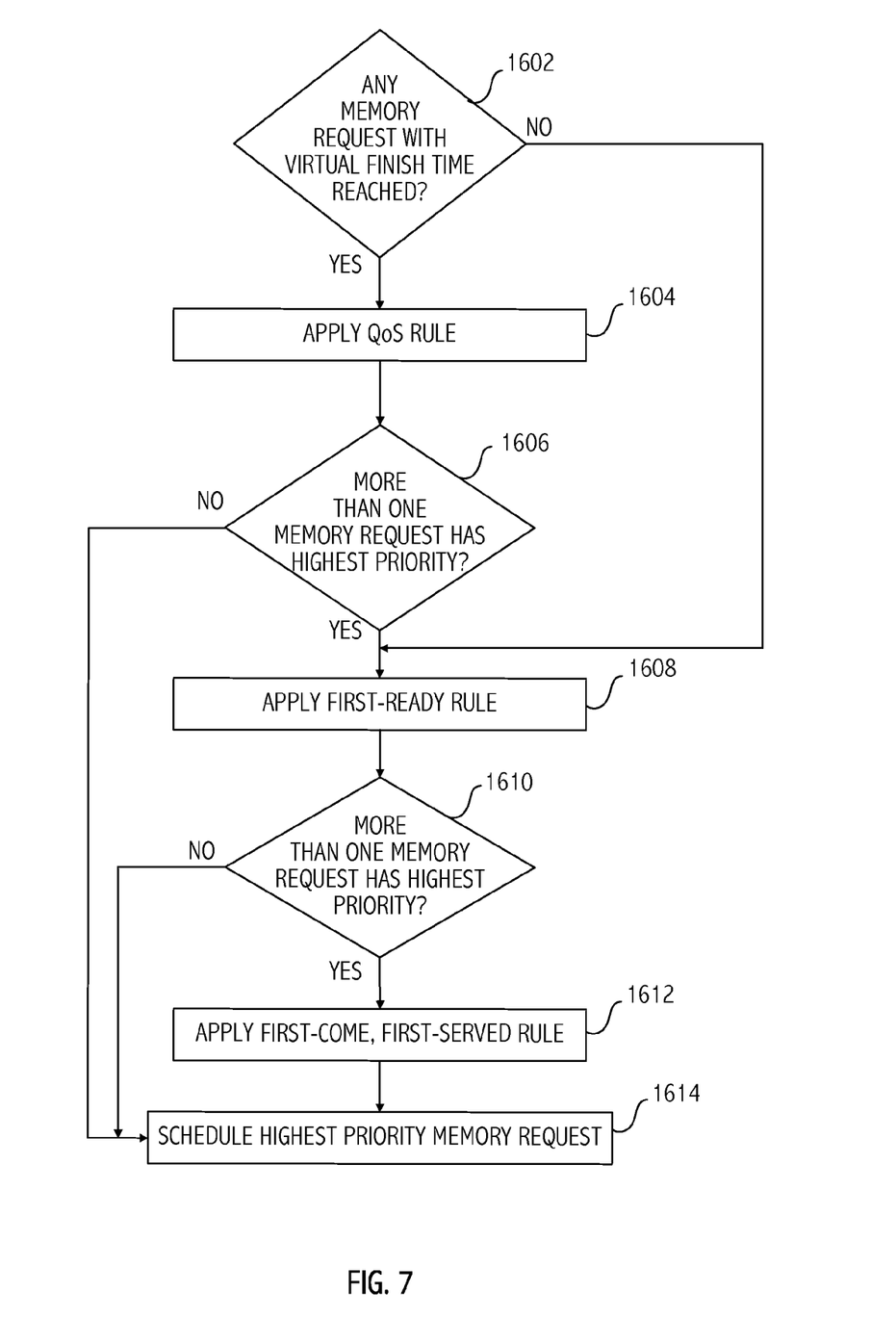
FIG. 7 illustrates information and control flows of the virtual-time-based quality-of-service scheduling technique, consistent with at least one embodiment of the invention.

Referring to FIGS. 6 and 7, in at least one embodiment of the virtual-time-based quality-of-service scheduling technique, for each memory cycle, scheduler 1506 determines whether the virtual finish time of any memory request in memory request queue 1504 has expired, i.e., the virtual clock for a thread corresponding to the memory request has reached or exceeded the virtual finish time of a memory request in the memory request queue (1602). Note that in at least one embodiment of the virtual-time-based quality-of-service scheduling technique, the virtual clock exists instantaneously, e.g., by computing the value of the memory clock times the predetermined share of system memory bandwidth, although in other embodiments, a counter that increments according to a number of memory clock cycles based on the predetermined share of system memory bandwidth may be maintained for the virtual clock for each thread.

In at least one embodiment, scheduler 1506 schedules a memory request to memory from memory request queue 1504 in response to expiration of a virtual finish time of the memory request. As described above, the virtual finish time is based on a share of system memory bandwidth associated with the memory request. Still referring to FIGS. 6 and 7 at a particular memory cycle, if one or more memory requests has reached its virtual finish time (1602), then scheduler 1506 applies a quality-of-service rule (1604). The quality-of-service rule sets to a highest priority those memory requests that have a corresponding virtual clock that has reached or exceeded their virtual finish time. If scheduler 1506 identifies only one memory request with an expired virtual finish time (1606), then scheduler 1506 schedules that memory request (1614). If at that memory cycle, more than one memory request has that highest priority (i.e., more than one memory request has an expired virtual finish time) (1606), then scheduler 1506 applies at least one other scheduling rule. In at least one embodiment, scheduler 1506 applies a first-ready rule (1608). The first-ready rule prioritizes a memory request that hits a row buffer over a memory request that misses a row buffer. After application of the first-ready rule, if only one memory request has the highest priority (1610), then scheduler 1506 schedules that memory request (1614). If more than one memory request has a highest priority after the quality-of-service rule and the first-ready rule (1610), then scheduler 1506 applies a first-come, first-served rule to those first-ready memory requests with an expired virtual finish time (1612) to identify a highest priority request. That is, scheduler 1506 schedules whichever memory request arrives at the memory controller earlier, before a memory request that arrives at the memory controller later (1614).

In at least one embodiment, scheduler 1506 schedules a memory request to memory from the memory request queue before the expiration of the virtual finish time of the memory request. For example, if a virtual finish time of each other memory request in the memory request queue has not expired, scheduler 1506 schedules the memory request based on at least one other scheduling rule. Still referring to FIGS. 6 and 7, at a particular memory cycle, if no memory request has reached its virtual finish time (1602), then scheduler 1506 applies at least one other scheduling rule. In at least one embodiment, scheduler 1506 applies a first-ready rule to the memory request queue (1608). If scheduler 1506 identifies only one highest priority memory request after the first-ready rule (1610), then scheduler 1506 schedules that memory request (1614). If more than one memory request has a highest priority after application of the first-ready rule (1610), then scheduler 1506 applies a first-come, first served rule to the memory requests (1612). Then, scheduler 1506 schedules the highest priority memory request (1614). Note that the type and sequence of scheduling rules applied after the quality-of-service rule may vary in other embodiments of the virtual-time-based quality-of-service scheduling technique.

If no memory request has had its virtual finish time expire, then the quality-of-service rule does not affect the scheduling. That is, the quality-of service rule does not affect scheduling when scheduler 1506 schedules memory requests before their associated virtual clock reaches their corresponding virtual finish time. Accordingly, the virtual-time-based distributed quality-of-service technique schedules memory requests for performance (e.g., using the first-ready rule) and fairness (e.g., using the first-come, first-served rule) if the memory controller is not under a heavy load. Note that other scheduling rules may be used in combination with, or instead of, the first-ready rule and the first-come, first served rule. By calculating a virtual finish time accurately, the virtual-time-based quality-of-service technique increases the likelihood that the quality-of-service rule is enforced over the other scheduling rules only when actually needed to enforce quality-of-service. Bursty traffic from multiple threads increases the likelihood that a memory request misses its virtual finish time. However, scheduler 1506 ensures that any such request receives the highest priority with the quality-of-service rule to get processed as early as possible.

Structures described herein may be implemented using software (which includes firmware) executing on a processor or by a combination of software and hardware. Software, as described herein, may be encoded in at least one computer readable medium. As referred to herein, a computer-readable medium includes at least a disk, tape, or other magnetic, optical, or electronic storage medium.

While circuits and physical structures are generally presumed, it is well recognized that in modern semiconductor design and fabrication, physical structures and circuits may be embodied in computer-readable descriptive form suitable for use in subsequent design, test or fabrication stages. Structures and functionality presented as discrete components in the exemplary configurations may be implemented as a combined structure or component. Various embodiments of the invention are contemplated to include circuits, systems of circuits, related methods, and tangible computer-readable medium having encodings thereon (e.g., HDL, Verilog, GDSII data) of such circuits, systems, and methods, all as described herein, and as defined in the appended claims.

The description of the invention set forth herein is illustrative, and is not intended to limit the scope of the invention as set forth in the following claims. For example, while the invention has been described in an embodiment in which an SDRAM memory system is used, one of skill in the art will appreciate that the teachings herein can be utilized for other memory systems (e.g., phase chance memory systems or memrister memory systems). Variations and modifications of the embodiments disclosed herein may be made based on the description set forth herein, without departing from the scope and spirit of the invention as set forth in the following claims.

What is claimed is:

1. A method comprising:
   calculating a virtual finish time of a memory request from a first thread of a plurality of threads executing on a plurality of processors, the virtual finish time being calculated based on a virtual clock for the first thread, the virtual clock for the first thread progressing slower than a memory clock according to a share of memory bandwidth allocated to the first thread;
   scheduling the memory request to a memory from a memory request queue in response to expiration of the virtual finish time of the memory request, expiration of the virtual finish time including the virtual clock for the first thread at least reaching the virtual finish time of the memory request; and
   scheduling the memory request to the memory from the memory request queue before the expiration of the virtual finish time of the memory request if a virtual finish time of each other memory request in the memory request queue has not expired and based on at least one other scheduling rule.

2. The method, as recited in claim 1, wherein the memory request queue resides in a first memory controller of a plurality of memory controllers.

3. The method, as recited in claim 1,
   wherein calculating the virtual finish time of the memory request is further based on at least one memory latency parameter selected according to an access type of the memory request, and a determination of whether the memory request has at least a portion of a physical address equal to a physical address of a last scheduled memory request associated with the first thread.

4. The method, as recited in claim 1,
   wherein calculating the virtual finish time of the memory request comprises calculating a virtual start time and a virtual job length of the memory request.

5. The method, as recited in claim 4, wherein the virtual job length of the memory request is calculated based on a job length of the memory request and the share of memory bandwidth associated with the memory request.

6. The method, as recited in claim 5, wherein the job length is based on an access type of the memory request and a determination of whether the memory request has at least a portion of a physical address equal to a portion of a physical address of a last scheduled memory request associated with the first thread.

7. The method, as recited in claim 5, wherein the job length is calculated based on at least one of precharge period latency, column-address strobe (CAS) latency, write latency, and activate-to-read-or-write latency associated with the memory.

8. The method, as recited in claim 4, wherein the virtual start time is calculated based on a maximum of an arrival time of the memory request and a virtual finish time of a last memory request from the first thread processed at a bank of the memory associated with the memory request.

9. The method, as recited in claim 4, wherein the virtual finish time of the memory request is further based on a maximum of an arrival time of the memory request and a virtual finish time of a last memory request from the first thread processed at a memory bank of the memory associated with the memory request.

10. The method, as recited in claim 1, wherein the at least one other scheduling rule includes scheduling the memory request according to a comparison of a physical address of the memory request with a physical address of a last memory request from the first thread processed at a memory bank associated with the memory request, thereby determining whether the request would hit a row buffer of memory.

11. The method, as recited in claim 1, wherein the at least one other scheduling rule includes scheduling the memory request before other memory requests requested after a request time of the memory request.

12. The method, as recited in claim 1, wherein in response to more than one memory request having an expired virtual finish time the scheduling comprises applying at least one other scheduling rule to the more than one memory request, to thereby identify the memory request as a highest priority memory request.

13. The method, as recited in claim 1, wherein the scheduling enforces a target quality-of-service system-wide over multiple memory controllers.

14. An apparatus comprising:
    a memory controller comprising:
        control logic configured to calculate a virtual finish time corresponding to a memory request requested by a first thread of a plurality of threads executing on a plurality of processors, the virtual finish time being determined according to a virtual clock for the first thread, the virtual clock for the first thread progressing slower than a memory clock according to a share of memory bandwidth allocated to the first thread;
        a memory request buffer operative to store the memory request and the virtual finish time; and
        a scheduler operative to schedule the memory request to memory in response to expiration of the virtual finish time, expiration of the virtual finish time including the virtual clock for the first thread at least reaching the virtual finish time, and operative to schedule the memory request to memory before the expiration of the virtual finish time if a virtual finish time of each other memory request in the memory request queue has not expired and based on at least one other scheduling rule.

15. The apparatus, as recited in claim 14 wherein the control logic is configured to calculate the corresponding virtual finish time based on an access type of the memory request and a determination of whether the memory request would hit a row buffer of the memory.

16. The apparatus, as recited in claim 14 wherein the control logic is configured to calculate the virtual finish time based on at least one of precharge period latency, column-address strobe (CAS) latency, write latency, and activate-to-read-or-write latency associated with the memory.

17. The apparatus, as recited in claim 14, wherein the at least one other scheduling rule includes scheduling the memory request according to a comparison of a physical address of the memory request with a physical address of a last memory request from the first thread processed at a memory bank of the memory associated with the memory request, thereby determining whether the memory request would hit a row buffer of the memory.

18. The apparatus, as recited in claim 14, wherein the at least one other scheduling rule includes scheduling the memory request before other memory requests requested after the memory request.

19. The apparatus, as recited in claim 14, wherein in response to more than one memory request having an expired virtual finish time the scheduler is operative to apply at least one other scheduling rule to the more than one memory request, to thereby identify the memory request as a highest priority memory request.

20. An apparatus comprising:
    a memory controller comprising:
        a memory request buffer operative to store a memory request and a corresponding virtual finish time;
        a scheduler operative to schedule the memory request to memory in response to expiration of the corresponding virtual finish time, the corresponding virtual finish time being based on a share of system memory bandwidth associated with the memory request and operative to schedule the memory request to memory before the expiration of the corresponding virtual finish time if a virtual finish time of each other memory request in the memory request queue has not expired and based on at least one other scheduling rule; and
    a plurality of storage elements per thread context supported by the memory controller, wherein the plurality of storage elements comprises, for each thread context:
        a virtual finish time storage element per memory bank, operative to store a virtual finish time of a last memory request from a thread associated with the thread context processed at the memory bank;
        a physical address storage element per memory bank operative to store a physical address of the last memory request from the thread processed at the memory bank; and
        a resource share storage element, operative to store the system memory bandwidth allocation of the thread.

21. The apparatus, as recited in claim 20, wherein the memory controller is one of a plurality of memory controllers, the memory request is requested by a first thread of a plurality of threads executing on a plurality of processors, and the share of system memory bandwidth associated with the memory request is a share of system memory bandwidth allocated to the first thread.

22. The apparatus, as recited in claim 20 wherein the memory controller is operative to determine the corresponding virtual finish time based on the share of system memory bandwidth associated with the memory request.

23. The apparatus, as recited in claim 20, wherein expiration of the virtual finish time includes the virtual clock for the first thread at least reaching the corresponding virtual finish time.

* * * * *